May 17, 1927.
W. H. HILL
AUTOMOBILE PEDAL
Filed Dec. 4, 1926
1,629,381
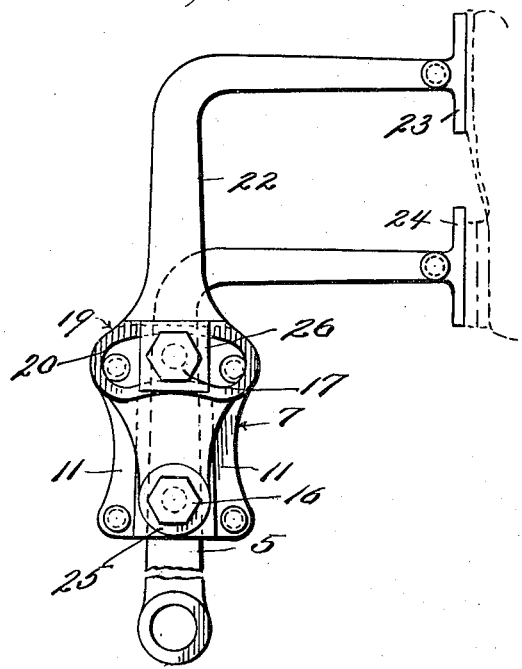
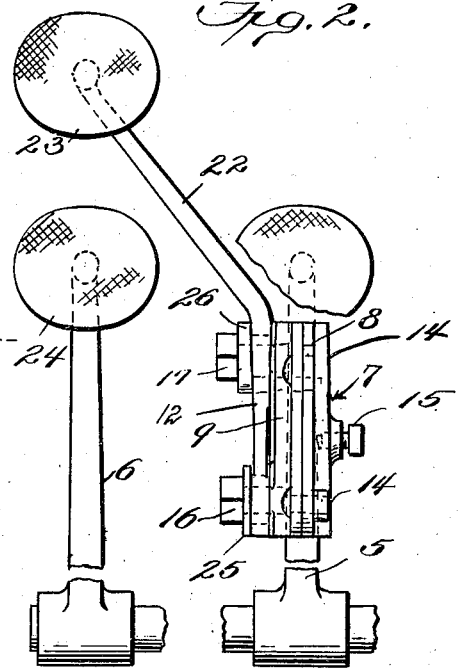
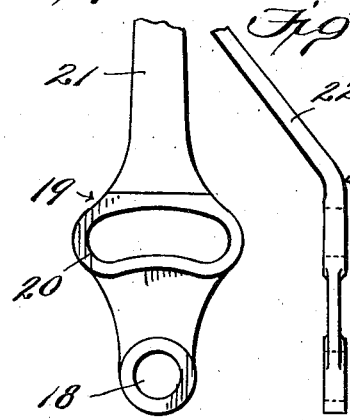
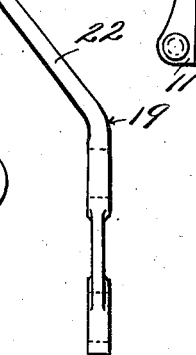
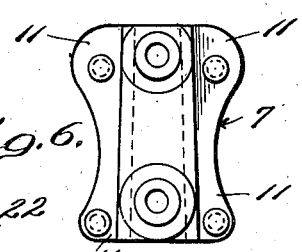
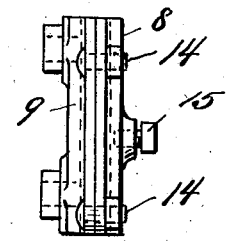
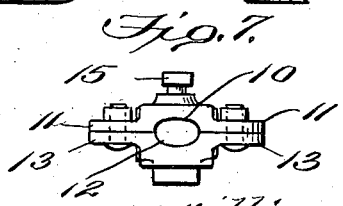
Inventor
William H. Hill
By
Attorney Patented May 17, 1927.

1,629,381

UNITED STATES PATENT OFFICE.

WILLIAM H. HILL, OF CHATTANOOGA, TENNESSEE.

AUTOMOBILE PEDAL.

Application filed December 4, 1926. Serial No. 152,630.

This invention relates to pedal structure for automobiles, and particularly to an attachment for controlling the operation of pedals.

The main object of the invention is to provide one pedal with a lateral pedal extension or pedal arm for disposition in operative alinement with relation to an adjacent pedal for permitting both of the pedals to be simultaneously operated by one pedal or individually operated by a heel and toe pressure of the foot of the driver of the machine.

A further object of the invention is to provide for a convenient and adjustable disposition of a pedal attachment or extension relatively to an adjacent pedal whereby a proper distance may be maintained between the pedal adjacent to which the extension is disposed for accommodating different distances apart of the main pedal and the extension or attachment as a provision for accommodating various lengths of feet of the operator or driver and also to insure a positive action of the two pedals, when desired, or permit either one of the pedals to be independently operated.

With these and other objects and advantages in view the invention consists in the construction and arrangement of the several parts which will be described and shown in one form and hereinafter fully claimed, and the features of novelty distinctly pointed out.

In the drawing:—

Figure 1 is a side elevation of a pedal showing the improved attachment applied thereto;

Figure 2 is a plan view or representation of two pedals ordinarily used in an automobile and one of the same having the improved extension or arm applied thereto and disposed adjacent to the remaining pedal;

Figure 3 is a detail elevation of the clamp which is used in the preferred form as means of applying the improved attachment;

Figure 4 is an edge elevation of the improved clamp;

Figure 5 is a front elevation of a part of the attachment or pedal arm particularly showing the segmental slot and fulcrum opening therefor;

Figure 6 is an edge elevation of the structure shown by Figure 5; and

Figure 7 is a top plan view of the improved clamp to particularly illustrate the shape of the opening provided by the association of the members of the clamp.

The numeral 5 designates one pedal and 6 the remaining pedal, these pedals being constructed as an ordinary pedal or similar devices now installed in automobiles, and one may be for operating the clutch and the other the brake, as the invention is not confined in the least to the attachment to either pedal, as it will be understood that the said improvement will be applicable to either pedal and work with equal efficiency, as may be desired by the driver. As shown, however, the improvement or attachment is applied to pedal 5, and in one form, to illustrate the mode of application, a clamp, generally indicated by 7, is used comprising a rear member 8 and a front member 9, the latter having the attachment directly applied thereto. The two members 8 and 9 of the clamp are applied to the shank or stem of the pedal 5, as illustrated, and the rear member 8 is formed with a semi-elliptical recess, as at 10, and also with lateral flanges 11, and the front member 9 is likewise formed with a semi-elliptical recess 12 and lateral flanges 13, the two members 9 and 10, when associated, tightly embracing the shank or stem of the pedal 5. The two flanges 11 and 13 of the clamp members 9 and 10 are tightly secured by bolts and nuts, as at 14, and the adjustment longitudinally of the said shank or stem of the pedal 5 is accomplished through the clamping screw 15 carried by the clamp member 8, as clearly shown by Figures 2, 4 and 7. The end of the clamping screw impinges positively against the adjacent side of the shank or stem of the pedal 5 and holds the clamping members 8 and 9 against movement after they have been applied and adjustment has been made in accordance with the setting of the attachment relatively to the remaining pedal 6.

The clamping member 9 also has projecting therefrom two set bolts or analogous fastenings 16 and 17, the set bolt or fastening 16 serving as the fulcrum for engaging an opening 18 at the rear end of the attachment, generally indicated by 19, and comprising, at a suitable distance from the opening 18 for the fulcrum bolt 16, a segmental slot 20. The rear end of the attachment is, therefore, suitably shaped, as shown by Figure 5, to accommodate the construction just explained, and the bolt 16 extends through the opening 18 into the clamping member 9 and the bolt 17 through the segmental slot 20 for setting the attachment at the proper angle, and with the adjustment of the clamp as a whole relatively to the shank or stem of the clamping member 5, will accommodate the distance of the attachment head from the head of the adjacent pedal 6. The attachment comprises a shank 21 which is laterally directed, as at 22, from the forward terminal or end of the clamping member, or from a point near the location of the segmental slot 20. The laterally deflected shank 21 of the attachment terminates in a forward pressure head 23 which is adapted to be alined in relation to and spaced from the head 24 of the pedal 6 or within such distance with relation to the latter head 24 that a positive operation of the two pedals at one and the same time, or of the pedal individually, may be accomplished through the pressure of the foot of the driver on the heads 23 and 24 either by a toe or a heel, or by a toe and heel pressure simultaneously applied to the said heads.

Suitable washers 25 and 26 are interposed between the heads of the bolts 16 and 17 and the rear straight extremity of the improved attachment and to facilitate the retention of the attachment in its adjusted position after it has been arranged in operative relation to the pedal 6. In view of the shiftable character of the clamp 7 as a whole on the shank or stem of the pedal 5 and the fulcrum application of the attachment, together with the segmental slot, it is obvious that the adjustment of the head 23 of the attachment may be readily accomplished and positively attained with certainty as to operation or when pressure is applied to both heads 23 and 24 by a full foot pressure or individually to the said heads by a toe or heel pressure, as the operation may require.

The improved attachment utilizing the clamp 7 as a means for holding the same in applied position to the shank or stem of one of the pedals is intended particularly for use with pedal structures already installed in a machine and by means of which two pedals may be simultaneously operated from one pedal or the pedals may also be individually controlled as the requirements of driving an automobile may require. It will be understood that the clamp 7 is but one means that could be adopted for applying the laterally projecting shank of the attachment to the pedal 5 and it is intended that the invention be considered in its broadest sense as applicable in any manner desired to the pedal to which it is directly attached or from which it extends without departing from the spirit of the invention.

Having fully described my invention, I claim:—.

1. The combination with adjacently located pedals, of a lateral pedal attachment carried by a part of one pedal extending into operative position with respect to the remaining pedal for operation of both pedals from one pedal or individual operation of each pedal.

2. The combination with adjacently located pedals, of a pedal attachment adjustably secured to one pedal and extending in advance of the remaining pedal for simultaneous operation of both pedals or individual actuation of each pedal.

3. The combination with adjacently located pedals of an attachment secured to one pedal and laterally extending in advance of and adjacent to the remaining pedal, the said attachment being laterally and longitudinally adjustable with relation to the pedal to which it is applied to properly position it with respect to the remaining pedal.

4. The combination with adjacently located pedals of a clamp applied to one pedal and having means for longitudinally moving and holding the said clamping means on the pedal to which it is applied and an attachment fulcrumed to a member of said clamp and laterally adjustable with relation thereto to properly locate the same with relation to the adjacent pedal.

5. The combination with adjacently located pedals of a pedal attachment laterally extending from one pedal and having means for laterally adjusting the same and a clamping means applied to the pedal from which the attachment extends and which is longitudinally adjustable to properly locate the attachment with respect to the remaining pedal.

In testimony whereof I have hereunto set my hand.

WILLIAM H. HILL.